US010664836B2

(12) United States Patent
Snyder et al.

(10) Patent No.: US 10,664,836 B2
(45) Date of Patent: May 26, 2020

(54) PAYMENT SYSTEM AND METHOD

(71) Applicant: Dave's Slingshot, LLC, Barrington, IL (US)

(72) Inventors: John Leonard Snyder, Westminster, MD (US); Andrew Anthony Boemi, Barrington, IL (US); Peter Charles Vogelberger, Lantana, FL (US)

(73) Assignee: Dave's Slingshot, LLC, Barrington, IL (US)

( * ) Notice: Subject to any disclaimer, the term of this patent is extended or adjusted under 35 U.S.C. 154(b) by 423 days.

(21) Appl. No.: 15/265,207

(22) Filed: Sep. 14, 2016

(65) Prior Publication Data

US 2017/0004495 A1    Jan. 5, 2017

Related U.S. Application Data

(63) Continuation-in-part of application No. 14/623,975, filed on Feb. 17, 2015, now Pat. No. 9,805,405.

(51) Int. Cl.
| | |
|---|---|
| *G06Q 20/38* | (2012.01) |
| *G06Q 20/10* | (2012.01) |
| *G06Q 20/12* | (2012.01) |
| *G06Q 20/20* | (2012.01) |
| *G06Q 20/32* | (2012.01) |
| *G06Q 20/40* | (2012.01) |
| *G06Q 50/00* | (2012.01) |
| *G06Q 10/08* | (2012.01) |

(Continued)

(52) U.S. Cl.
CPC ....... *G06Q 20/3821* (2013.01); *G06Q 10/083* (2013.01); *G06Q 20/10* (2013.01); *G06Q 20/12* (2013.01); *G06Q 20/20* (2013.01); *G06Q 20/24* (2013.01); *G06Q 20/322* (2013.01); *G06Q 20/3223* (2013.01); *G06Q 20/40* (2013.01); *G06Q 30/0617* (2013.01); *G06Q 50/01* (2013.01)

(58) Field of Classification Search
CPC .... G06Q 20/3821; G06Q 20/10; G06Q 20/12; G06Q 20/20; G06Q 20/322; G06Q 20/3223; G06Q 20/40; G06Q 50/01
USPC .......................................................... 705/44
See application file for complete search history.

(56) References Cited

U.S. PATENT DOCUMENTS 5,903,721 A * 5/1999 Sixtus .................... G06Q 20/02
                                                        726/2
6,185,545 B1 * 2/2001 Resnick ................ G06Q 20/02
                                                        705/40

(Continued)

OTHER PUBLICATIONS

U.S. Appl. No. 14/623,975, filed Feb. 17, 2015.

*Primary Examiner* — Robert R Niquette
(74) *Attorney, Agent, or Firm* — Leydig, Voit & Mayer, Ltd.

(57) ABSTRACT

A payment system for facilitating a desired transaction over a social media platform includes a computer server programmed and operating to maintain a user account in a database, the user account including at least a user credential, a user computing device credential, and a user mobile credit account. The computer server maintains a merchant account in the database, the merchant account including at least a merchant mobile credit account. The computer server further operates to authenticate the user, authenticate the user computing device, and process a debit to the user mobile credit account a credit to the merchant mobile credit account.

20 Claims, 9 Drawing Sheets

(51) Int. Cl.
  *G06Q 20/24* (2012.01)
  *G06Q 30/06* (2012.01)

(56) References Cited

U.S. PATENT DOCUMENTS

| | | | |
|---|---|---|---|
| 2005/0131838 A1* | 6/2005 | Woodward | G06Q 20/00 705/71 |
| 2007/0244811 A1* | 10/2007 | Tumminaro | G06Q 20/10 705/39 |
| 2007/0255652 A1* | 11/2007 | Tumminaro | G06Q 20/10 705/39 |
| 2010/0121701 A1 | 5/2010 | Nguyen et al. | |
| 2011/0307381 A1* | 12/2011 | Kim | G06O 20/027 705/44 |
| 2013/0042314 A1* | 2/2013 | Kelley | H04L 9/3215 726/9 |
| 2013/0073432 A1 | 3/2013 | Mulholland | |
| 2013/0282581 A1 | 10/2013 | Singh | |
| 2013/0282588 A1 | 10/2013 | Hruska | |
| 2013/0329889 A1 | 12/2013 | Griffith | |
| 2014/0310171 A1* | 10/2014 | Grossman | G06Q 20/385 705/44 |
| 2014/0372188 A1* | 12/2014 | Desideri | G06Q 30/0214 705/14.16 |

\* cited by examiner

PAYMENT SYSTEM AND METHOD

CROSS-REFERENCE TO RELATED APPLICATIONS

This application is a continuation in part of co-pending U.S. patent application Ser. No. 14/623,975, filed Feb. 17, 2015, which is incorporated herein in its entirety by this reference.

TECHNICAL FIELD

The technical field of this disclosure is payment systems and methods for electronic commerce, particularly, mobile device payment systems and methods.

BACKGROUND OF THE INVENTION

Using a mobile device to purchase goods and services online is becoming increasingly common. Traditionally, merchants create websites to display and document their goods and services. Consumers visit these websites to find something specific, simply browse to see what is available, or discover something through serendipity. With the proliferation of mobile devices having smaller screens and primitive controls, merchants are now offering applications ("apps") designed to operate independently on these devices, outside web browsers, with simpler navigation controls and data entry tools. Because the business rules, processing, and data reside on remote servers, the apps must still be wirelessly connected to servers in order to function.

Regardless of the platform, presently available online payment systems require the merchant to provide a mechanism to complete a purchase and receive the associated funds. This is often the most cumbersome part of the process, particularly if the consumer is a first-time customer of the particular merchant. There are a wide variety of payment systems and platforms, e.g., PayPal, available for mobile devices to make payments, but virtually all are tied directly to processing by third party credit card or debit card companies (e.g., Visa, Citibank, etc.) in conjunction with these purchases.

Typically, third party credit card or debit card companies extract a fee for processing the payment, averaging 2% or more of the payment amount. The payment processing fee is normally paid by the merchants themselves who pass at least a portion of the fee through to consumers in pricing of goods and services. Thus, the third party payment processing increases costs to the consumers.

Another problem with presently available payment systems is the lack of security. Sensitive personal and financial information, such as names, card numbers, and passwords, are exposed every time a consumer makes a purchase. Thieves steal credit/debit card information from poorly secured corporate locations. Actual thefts and the risk of financial liability to consumers and merchants both increase the costs of web commerce and discourage consumers from purchasing online.

Additionally, the use of social media is growing among persons of all ages, and companies, worldwide. With respect to payments, social media platforms currently supports person-to-person (P2P) payments (e.g., Facebook Payments in Messenger), which involve use of personal and merchant bank accounts to transfer funds between consumers. Ubiquitous social media providers, with both a personal (consumer) and a commercial (merchant) user base, already encompass most of the participants in retail commerce.

Existing payment systems for connecting purchasers with sellers are available in a variety of options, all of which are complicated and expensive for both the consumer and the merchant. Moreover, payment systems currently used on social media platforms are susceptible to hacking, because sensitive financial information must be exchanged on an open internet connection, or rely on legacy payment methods such as credit cards, paypal, and the like. Other, newer payment methods such as Apple Pay, Samsung Pay, and the like charge additional fees.

It would, therefore, be desirable to have mobile device payment systems and methods that would overcome the above disadvantages.

SUMMARY OF THE DISCLOSURE

In one aspect, the present disclosure describes a payment system for facilitating a transaction between a user and a merchant for a desired transaction of goods or services. The payment system includes a user computing device, which is configured to be operated by the user, and a social media platform, which includes a database associated with a computer server that is in communication with the user computing device for exchange of information. A merchant computing device is operated by the merchant and is in communication with the computer server of the social media platform.

In one embodiment, when a desired transaction is identified by the user on the computing device, the computer server is programmed and operates to maintain a user account in the database, the user account including at least a user credential, a user computing device credential, and a user mobile credit account; and maintain a merchant account in the database, the merchant account including at least a merchant mobile credit account. The computer server further operates to authenticate the user, authenticate the user computing device, and process a debit to the user mobile credit account a credit to the merchant mobile credit account.

In another aspect, the disclosure describes a method for facilitating a transaction between a user and a merchant for a desired transaction of goods or services. The method includes providing a user computing device configured to be operated by the user, and operating a social media platform including a database associated with a computer server, the computer server being in communication with the user computing device for exchange of information. A merchant computing device is provided in communication with the computer server of the social media platform.

In one embodiment, the user identifies a desired transaction. The computer server is used to maintain a user account in the database, the user account including at least a user credential, a user computing device credential, and a user mobile credit account. The computer server is also used to maintain a merchant account in the database, the merchant account including at least a merchant mobile credit account. The computer server authenticates the user, authenticates the user computing device, and facilitates the desired transaction by processing a debit to the user mobile credit account a credit to the merchant mobile credit account.

The foregoing and other features and advantages of the invention will become further apparent from the following detailed description of the presently preferred embodiments, read in conjunction with the accompanying drawings. The detailed description and drawings are merely illustrative of the invention, rather than limiting the scope of the disclosure being defined by the appended claims and equivalents thereof.

DETAILED DESCRIPTION OF THE DRAWINGS

The present disclosure relates generally to a payment system and, more specifically, to a secured payment system that is facilitated between a customer and a merchant through a social media platform. The disclosed payment system expands a connection or relationship between a customer and a seller on a social media network by adding the capability to securely transact business on the social media platform in a simpler and less expensive fashion than is currently available. In the contemplated embodiments, the social media network provides a no-cost link between consumers and merchants that can be used for retail payments. Shopping and selection can still be performed on the merchants own website, in a physical store, or via online advertising both in the Internet as well on the social media platform itself.

In the present disclosure, consumer monetary credits are referred to as "mCreds." The term mCreds, which is a contraction of the words "mobile" and "credits," generally represents a payment process that involves the secure exchange of value as payment for products or services purchased. As can be appreciated, mCreds can be embodied as any type of legal currency, and can also involve other types of portable or liquid assets such as bitcoins, cryptocurrency or other digital assets, merchant credit and the like. The particular value exchanged is also contemplated to be based on a banking or other underwriting system and be transportable not only domestically within a particular country or region, but also internationally.

Figure 1:
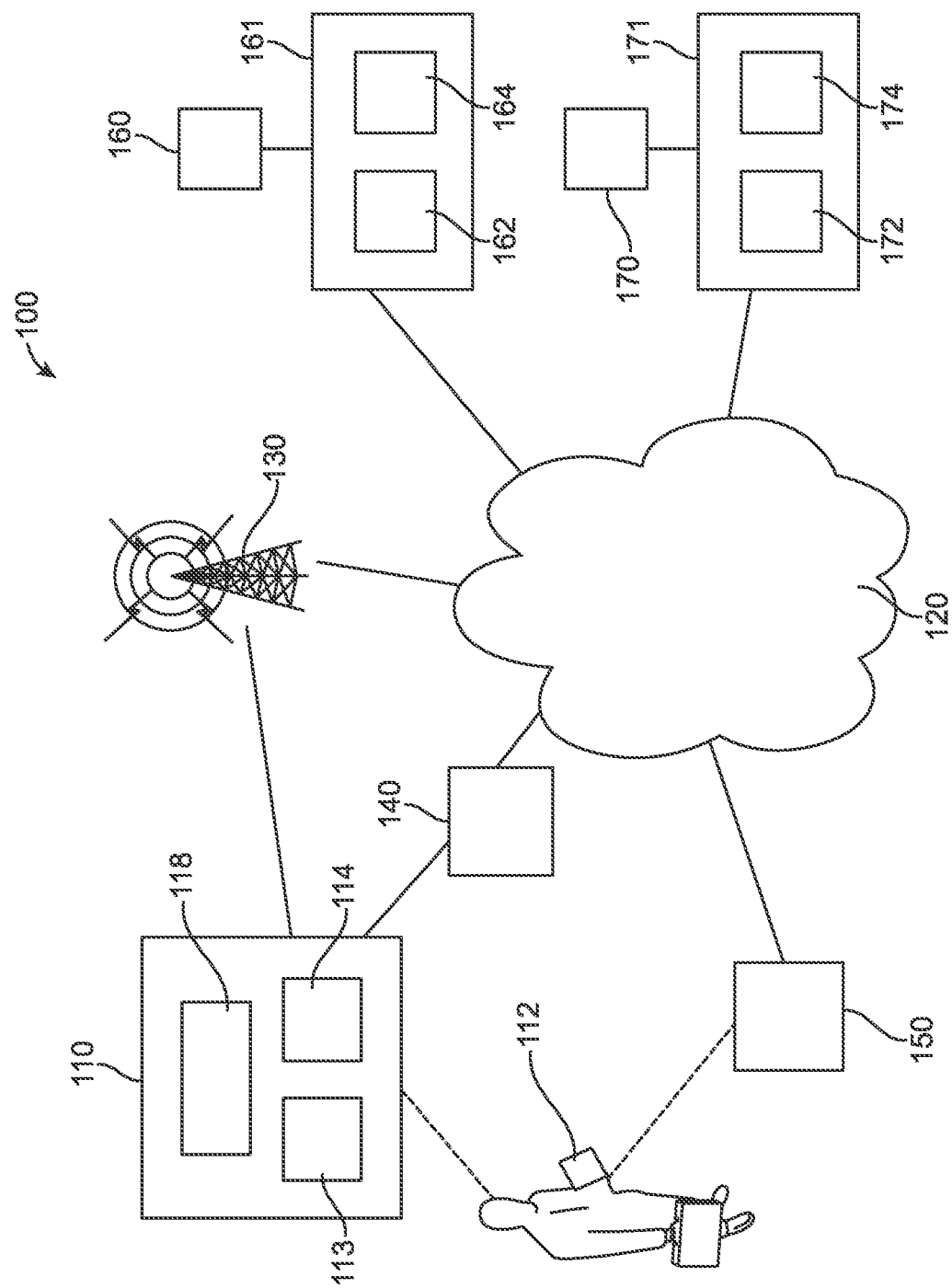
FIG. 1 is a schematic diagram of communication architecture for a mobile device payment system in accordance with the disclosure.

FIG. 1 is a schematic diagram of a mobile device payment system with communication architecture in accordance with the disclosure. The mobile device payment system allows a mobile device user to purchase goods/services from a merchant with financing by a mobile device manufacturer.

The mobile device payment system 100 includes a mobile device 110, a merchant server 171, and a mobile device manufacturer server 161. Each of the mobile device 110, merchant server 171, and mobile device manufacturer server 161 is operable to communicate with the others, i.e., the mobile device 110 is operable to communicate with the merchant server 171 and the mobile device manufacturer server 161, the merchant server 171 is operable to communicate with the mobile device 110 and the mobile device manufacturer server 161, and the mobile device manufacturer server 161 is operable to communicate with the mobile device 110 and the merchant server 171. The mobile device 110, merchant server 171, mobile device manufacturer server 161, and optional personal computer 150 include hardware and software as required to connect to the Internet 120.

The mobile device 110, which is defined herein as a smart phone, digital tablet, or any other portable wireless mobile device allowing a mobile device user 112 to communicate with the mobile device manufacturer server 161 and/or the merchant server 171, is operable to connect the user 112 to the Internet 120 through a cellular system 130 or a Wi-Fi node 140. The mobile device 110 can be obtained by the mobile device user 112 from a mobile device manufacturer 160. The mobile device manufacturer as defined herein can be any entity controlling the hardware and software implementation of the mobile device, such as a mobile device manufacturer, mobile device supplier, mobile device distributor, mobile phone network provider, or the like. The mobile device user 112 can optionally connect to the Internet 120 with a personal computer 150 that can optionally be used as part of establishing a user account for the mobile device user with the mobile device manufacturer, such as confirming details of the user account, confirming that the user account has been established, or the like. The mobile device 110 has a permanent identifier 118 embedded in the mobile device 110. The mobile device 110 also has a device processor 113 and device memory 114 operably connected to the device processor 113. The mobile device 110 can also include a graphic user interface (not shown) for input and output of information.

The merchant server 171 is operable to connect the merchant 170 to the Internet 120. The merchant server 171 has a merchant processor 172 and a merchant memory 174 operably connected to the merchant processor 172.

The mobile device manufacturer server 161 is operable to connect a mobile device manufacturer 160 to the Internet 120. The mobile device manufacturer server 161 has a supplier processor 162 and a supplier memory 164 operably connected to the supplier processor 162.

In the embodiment described in association with FIG. 2 below, the mobile device 110 can include storage for a universal merchant account data set and a consumer account. The universal merchant account data set is a compilation of the merchant accounts, which include a merchant identifier and merchant credit deposit information for each of the merchants. The consumer account includes credit for the mobile device user on the mobile device. In one embodiment, the universal merchant account data set and/or consumer account are stored in the device memory 114. In another embodiment, the universal merchant account data set and/or consumer account are stored in additional memory (not shown) independent of the device memory 114. In yet another embodiment, the universal merchant account data set and/or consumer account are stored in a solid-state chip (not shown), which is installed in the mobile device by the mobile device manufacturer or is installed in the mobile device by the mobile device user after the mobile device user receives the mobile device.

In embodiments described in association with FIGS. 3 & 6 below, the mobile device payment system 100 can include a merchant mobile device. As used herein, a merchant mobile device is defined as a smart phone, digital tablet, or any other portable wireless mobile device allowing the merchant 170 to communicate with the mobile device 110, the merchant server 171, and/or the mobile device manufacturer server 161.

Those skilled in the art will appreciate that the mobile device payment system 100 can be used to carry out mobile device payment methods such as those discussed in association with FIGS. 2-6 below. The memory of the particular device stores programming code executable by the processor of the particular device to carry out portions of the method performed by the particular device. Referring to FIG. 1, the memories (device memory 114, merchant memory 174, supplier memory 164) of the mobile device 110, merchant server 171, and mobile device manufacturer server 161 can store programming code executable by their respective processors (device processor 113, merchant processor 172, supplier processor 162) to carry out the mobile device payment methods.

The memories (device memory 114, merchant memory 174, supplier memory 164) of the mobile device 110, merchant server 171, and mobile device manufacturer server 161 can also store data. The merchant server 171 and mobile device manufacturer server 161 can be hardware and/or software servers, and can be single hardware devices or can be a number of distributed hardware devices as desired for a particular application. The mobile device 110, merchant server 171, and mobile device manufacturer server 161 can also include communication hardware/software as required to carry out the mobile device payment method.

The use of the mobile device payment system 100 to carry out mobile device payment methods such as those discussed in association with FIGS. 2-6 below can be illustrated by the use of the mobile device payment system 100 to carry out the mobile device payment method as discussed in association with FIG. 2. Those skilled in the art will appreciate that programming code for a step of the method initiated in one device can require complementary programming code for a step of the method completed in another device, e.g., the device memory 114 of the mobile device 110 can contain device programming code executable by the device processor 113 for establishing a user account for the mobile device user with the mobile device manufacturer and the supplier memory 164 of the mobile device manufacturer server 161 can contain complementary supplier programming code executable by the supplier processor 162 to carry out establishing a user account. In this example, the device processor 113 of the mobile device 110 stores a consumer account and a universal merchant account, and has a permanent identifier 118 embedded in the mobile device 110.

The device memory 114 of the mobile device 110 can contain device programming code executable by the device processor 113 for: establishing a user account for the mobile device user with the mobile device manufacturer, the user account associating the mobile device user with the permanent identifier; storing the universal merchant account data set in the universal merchant account of the mobile device; requesting the mobile device manufacturer to load consumer credit into the consumer account by providing a credit amount and the permanent identifier to the mobile device manufacturer; identifying goods/services for purchase from a selected one of the merchants by the mobile device user on the mobile device; determining a total price for the identified goods/services and a merchant identifier associated with the selected merchant on the mobile device; actuating a purchase button on the mobile device; retrieving merchant bank deposit instructions for the associated merchant identifier from the universal vendor account in response to the actuating the purchase button; retrieving purchase credit in an amount of the total price from the consumer account in response to the actuating the purchase button; and routing the retrieved credit to the selected merchant in accordance with the retrieved merchant credit deposit instructions.

The merchant memory 174 of the merchant server 171 can contain merchant programming code executable by the merchant processor 172 for establishing merchant accounts for the merchants with the mobile device manufacturer, the merchant accounts including a merchant identifier and merchant credit deposit information for each of the merchants.

The supplier memory 164 of the mobile device manufacturer server 161 can contain supplier programming code executable by the supplier processor 162 for: providing the universal merchant account data set to the mobile device user; and loading the credit amount into the consumer account of the mobile device associated with the permanent identifier.

Those skilled in the art will appreciate that the communication architecture for the mobile device payment system 100 is an example and that any number of other communication configurations can be used to carry out the method for a mobile device user to purchase goods/services from a merchant with financing by a mobile device manufacturer described above.

Figure 2:
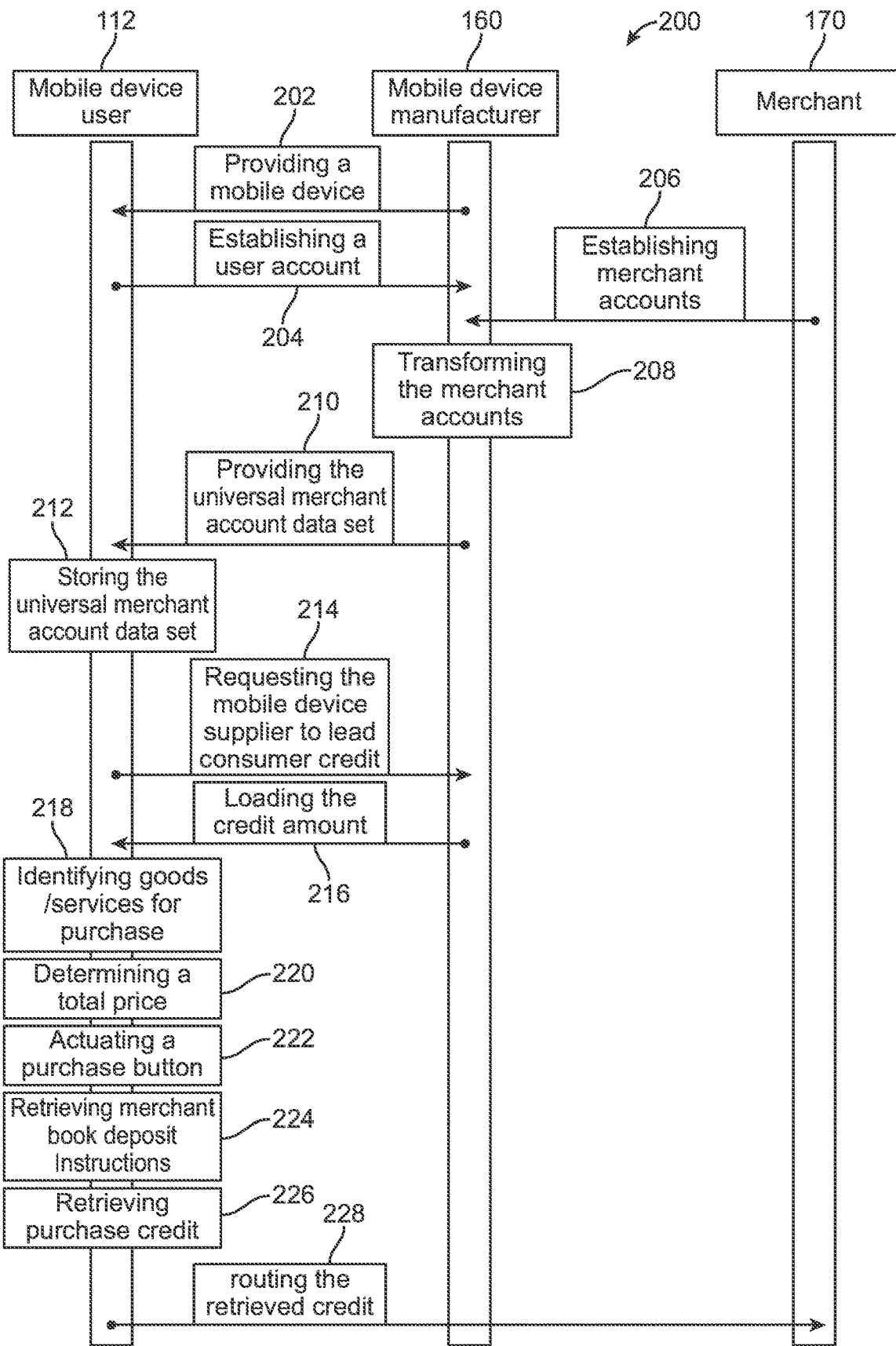
FIG. 2 is a block diagram of one embodiment of a mobile device payment method in accordance with the disclosure.

FIG. 2 is a block diagram of one embodiment of a mobile device payment method in accordance with the disclosure. In this embodiment, the mobile device user stores consumer credit and merchant account information on the mobile device, which then acts as a stand-alone credit/debit card. The method 200 can be performed on the mobile device payment system describe in association with FIG. 1 above.

Referring to FIG. 2, the method 200 for a mobile device user to purchase goods/services from merchants with financing by a mobile device manufacturer can include: providing a mobile device 202 from the mobile device manufacturer to the mobile device user, the mobile device including a consumer account and a universal merchant account, the mobile device having a permanent identifier embedded in the mobile device; establishing a user account 204 for the mobile device user with the mobile device manufacturer, the user account associating the mobile device user with the permanent identifier; establishing merchant accounts 206 for the merchants with the mobile device manufacturer, the merchant accounts including a merchant identifier and merchant credit deposit information for each of the merchants; transforming the merchant accounts 208 into a universal merchant account data set; providing the universal merchant account data set 210 to the mobile device user; storing the universal merchant account data set 212 in the universal merchant account of the mobile device; requesting the mobile device manufacturer to load consumer credit 214 into the consumer account by providing a credit amount and the permanent identifier to the mobile device manufacturer; loading the credit amount 216 into the consumer account of the mobile device associated with the permanent identifier; identifying goods/services for purchase 218 from a selected one of the merchants by the mobile device user on the mobile device; determining a total price 220 for the identified goods/services and a merchant identifier associated with the selected merchant on the mobile device; actuating a purchase button 222 on the mobile device; retrieving merchant bank deposit instructions 224 for the associated merchant identifier from the universal vendor account in response to the actuating the purchase button; retrieving purchase credit 226 in an amount of the total price from the consumer account in response to the actuating the purchase button; and routing the retrieved credit 228 to the selected merchant in accordance with the retrieved merchant credit deposit instructions. The permanent identifier is a unique identifier for the mobile device and the merchant identifier is a unique identifier for each merchant.

The method 200 can also account for shipping information. The user account can further associate the mobile device user with a shipping address. In one example, the method 200 also can include: sending an electronic order for the identified goods/services from the mobile device to the merchant in response to the actuating the purchase button, the electronic order including the permanent identifier and goods/services details for the identified goods/services, and no additional information about the mobile device user; sending a shipping address request including the permanent identifier from the mobile device to the mobile device manufacturer in response to the actuating the purchase button; and sending the shipping address from the mobile device manufacturer to the merchant in response to the sending a shipping address request. In another example, the method 200 also can include: sending an electronic order for the identified goods/services from the mobile device to the merchant in response to the actuating the purchase button, the electronic order including the permanent identifier and goods/services details for the identified goods/services, and no additional information about the mobile device user; receiving the electronic order at the merchant; sending a shipping address request including the permanent identifier from the merchant to the mobile device manufacturer in response to the receiving the electronic order button; and sending the shipping address from the mobile device manufacturer to the merchant in response to the sending a shipping address request. As used herein, "no additional information about the mobile device user" is defined as any information from which a third party could discern the identity of the mobile device user. In one embodiment, the mobile device can be selected from the group consisting of a smart phone and a digital tablet. In one embodiment, the mobile device manufacturer can be a mobile device manufacturer.

The method 200 can also clear transaction information from the mobile device after a purchase. In one example, the method 200 can also include clearing temporary storage registers on the mobile device in response to the routing of the retrieved credit 228 to the selected merchant.

The providing a mobile device 202; establishing a user account 204; establishing merchant accounts 206; transforming the merchant accounts 208 into a universal merchant account data set; providing the universal merchant account data set 210; and storing the universal merchant account data set 212 prepares the mobile device payment system for use by the mobile device user. The requesting the mobile device manufacturer to load consumer credit 214 and loading the credit amount 216 into the consumer account of the mobile device associated with the permanent identifier sets up the mobile device as a credit/debit card with money loaded on the mobile device, so that the mobile device user can make a purchase using the mobile device. The identifying goods/services for purchase 218; determining a total price 220; actuating a purchase button 222 on the mobile device; retrieving merchant bank deposit instructions 224; retrieving purchase credit 226; and routing the retrieved credit 228 allows the mobile device user to purchase particular goods/services and pay the merchant for the particular goods/services.

The preparation of the mobile device payment system for use can include various embodiments. In one embodiment, the establishing merchant accounts 206 for the merchants with the mobile device manufacturer can include randomly selecting an alphanumeric code as the merchant identifier. In one embodiment, the organizing the merchant accounts 208 can include encrypting the universal merchant account data set. In one embodiment, the providing the universal merchant account data set 210 to the mobile device user can include providing the universal merchant account data set to the mobile device user with the universal merchant account data set stored on a solid-state chip and the storing the universal merchant account data set 212 in the universal merchant account of the mobile device can include plugging the solid-state chip into the mobile device. In one embodiment, the transforming the merchant accounts 208 into a universal merchant account data set for the merchants with the mobile device manufacturer can include establishing merchant accounts for the merchants located within a specified geographic area. In another embodiment, the transforming the merchant accounts 208 into a universal merchant account data set for the merchants with the mobile device manufacturer can include prescreening and selection of the merchant accounts by the mobile device manufacturer.

The setting up of the mobile device as a credit/debit card can also include various embodiments. In one embodiment, the loading the credit amount 216 into the consumer account can include loading the credit amount into the consumer account from a user cash account maintained with the mobile device manufacturer. In another embodiment, the loading the credit amount 216 into the consumer account can include loading the credit amount into the consumer account from a user revolving credit account maintained with the mobile device manufacturer. In one embodiment, the loading the credit amount 216 into the consumer account establishes a credit balance on the mobile device, and the method 200 further can include reducing the credit balance in the consumer account by the amount of the total price in response to the retrieving credit. The method 200 can further include restoring the credit balance to an initial value by loading the amount of the total price into the consumer account from a user account maintained with the mobile device manufacturer, the user account being selected from the group consisting of a user cash account and a user revolving credit account.

The purchase of particular goods/services and payment of the merchant for the particular goods/services can also include various embodiments. In one embodiment, the identifying goods/services for purchase 218 from a selected one of the merchants by the mobile device user on the mobile device can include ringing up the identified goods/services for purchase on a cash register at a physical store of the selected merchant; and the determining a total price 220 for the identified goods/services and a merchant identifier associated with the selected merchant on the mobile device can include calculating the total price for the rung up identified goods/services; and transferring the calculated total price and the merchant identifier to the mobile device.

The transferring the calculated total price and the merchant identifier to the mobile device can include optically scanning the calculated total price and the merchant identifier with the mobile device. In one example, the calculated total price and the merchant identifier are embedded in a QR code for optical scanning. In another example, the calculated total price and the merchant identifier are displayed in alphanumeric characters on paper, a graphics display, or any other visual display, and the optically scanning further can include optical character recognition of the alphanumeric characters. In one example, the transferring the calculated total price and the merchant identifier to the mobile device can include wirelessly transferring the calculated total price and the merchant identifier to the mobile device.

In one embodiment, the actuating a purchase button 222 on the mobile device can include actuating a purchase button displayed on a webpage of the selected merchant.

Figure 3:
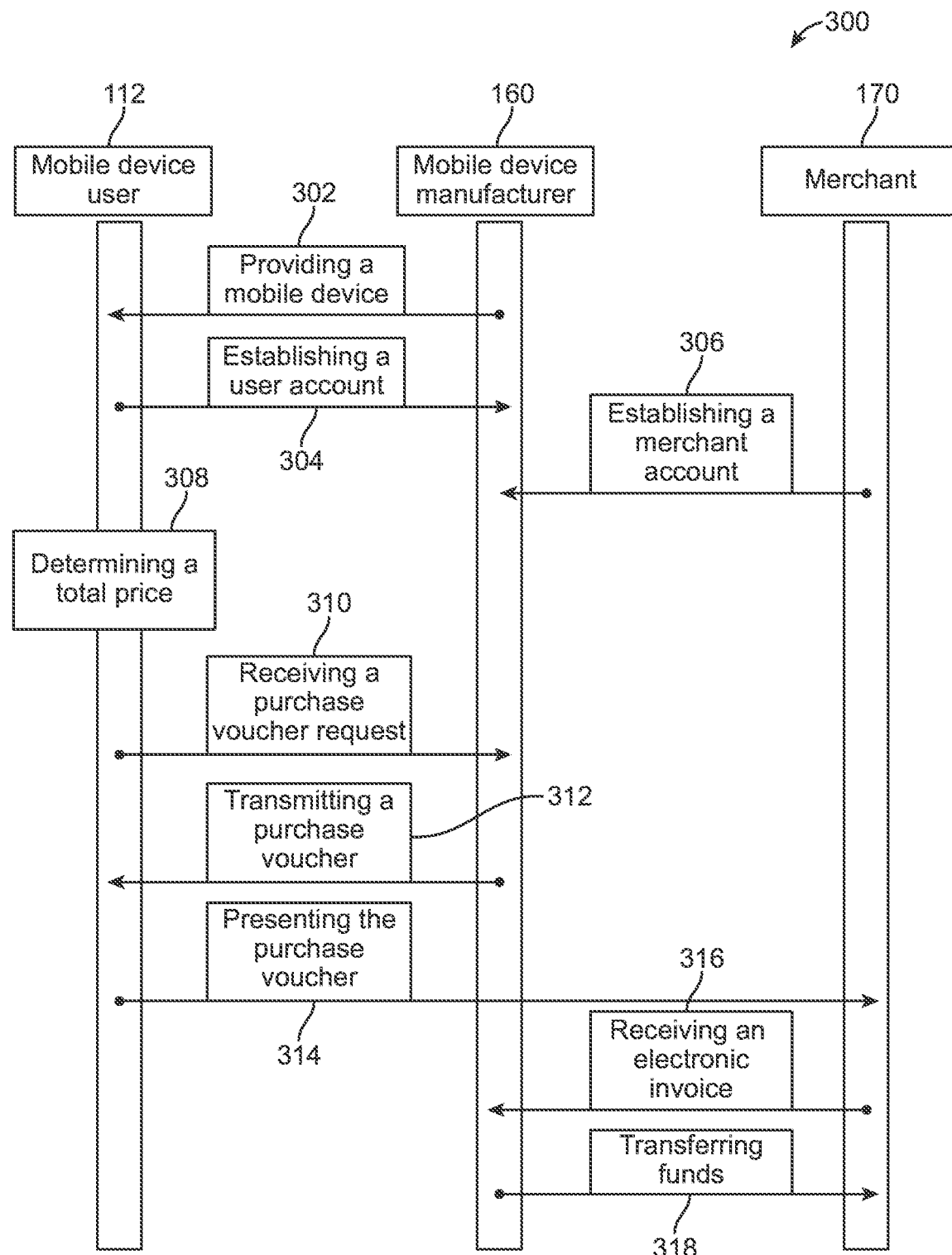
FIG. 3 is a block diagram of another embodiment of a mobile device payment method in accordance with the disclosure.

FIG. 3 is a block diagram of another embodiment of a mobile device payment method in accordance with the disclosure. In this embodiment, the mobile device user requests a purchase voucher from the mobile device manufacturer, which transmits the purchase voucher to the mobile device. The method 300 can be performed on the mobile device payment system describe in association with FIG. 1 above.

Referring to FIG. 3, the method 300 for a mobile device user to purchase goods/services from a merchant with financing by a mobile device manufacturer can include providing a mobile device 302 from the mobile device manufacturer to the mobile device user, the mobile device having a permanent identifier embedded in the mobile device; establishing a user account 304 for the mobile device user at the mobile device manufacturer, the user account associating the mobile device user with the permanent identifier; establishing a merchant account 306 for the merchant at the mobile device manufacturer, the merchant account including a merchant identifier for the merchant; determining a total price 308 for goods/services for purchase from the merchant by the mobile device user; receiving a purchase voucher request 310 from the mobile device at the mobile device manufacturer, the purchase voucher request including the permanent identifier and the total price; transmitting a purchase voucher 312 from the mobile device manufacturer to the mobile device in response to the receiving a purchase voucher request, the purchase voucher including an authorized payment amount equal to the total price; presenting the purchase voucher 314 to the merchant; receiving an electronic invoice 316 from the merchant at the mobile device manufacturer, the electronic invoice including the purchase voucher and the merchant identifier; and transferring funds 318 for the authorized payment amount from the mobile device manufacturer to the merchant in response to the receiving an electronic invoice from the merchant at the mobile device manufacturer. The permanent identifier is a unique identifier for the mobile device and the merchant identifier is a unique identifier for each merchant.

The providing a mobile device 302; establishing a user account 304; and establishing a merchant account 306 prepares the mobile device payment system for use by the mobile device user. The determining a total price 308 allows the mobile device user to initiate purchase of particular goods/services. The receiving a purchase voucher request 310; transmitting a purchase voucher 312; and presenting the purchase voucher 314 provides the mobile device user with a purchase voucher from the mobile device manufacturer to be used in purchasing the particular goods/services. The receiving an electronic invoice 316 and transferring funds 318 allows the mobile device manufacturer to pay the merchant for the particular goods/services.

The purchasing of the particular goods/services can include various embodiments. In one embodiment, the presenting the purchase voucher 314 to the merchant can also include determining the merchant identifier for the merchant on the mobile device; and presenting the merchant identifier to the merchant with the purchase voucher. In one example, the mobile device includes a merchant identifier table of merchant identifiers associated with a plurality of merchants, and the determining the merchant identifier can also include displaying a merchant list of the plurality of merchants on the mobile device; selecting one of the plurality of merchants from the merchant list; and looking up the merchant identifier for the selected one of the plurality of merchants from the merchant identifier table. In another example, the mobile device includes a merchant identifier table of merchant identifiers associated with a plurality of merchant GPS coordinates, and the determining the merchant identifier can also include determining a current GPS location for the mobile device; matching the current GPS location with one of the plurality of merchant GPS coordinates in the merchant identifier table; and looking up the merchant identifier for the matched one of the plurality of merchant GPS coordinates from the merchant identifier table.

In one embodiment, the presenting the purchase voucher 314 to the merchant can include presenting the purchase voucher to the merchant through a merchant mobile device. As used herein, a merchant mobile device is defined as a smart phone, digital tablet, or any other portable wireless mobile device allowing the merchant 170 to communicate with the mobile device, the merchant server, and/or the mobile device manufacturer server. The merchant mobile device allows the merchant 170 to receive the purchase voucher from the mobile device user 112 and/or to forward the purchase voucher to the mobile device manufacturer 160 in an electronic invoice.

Figure 4:
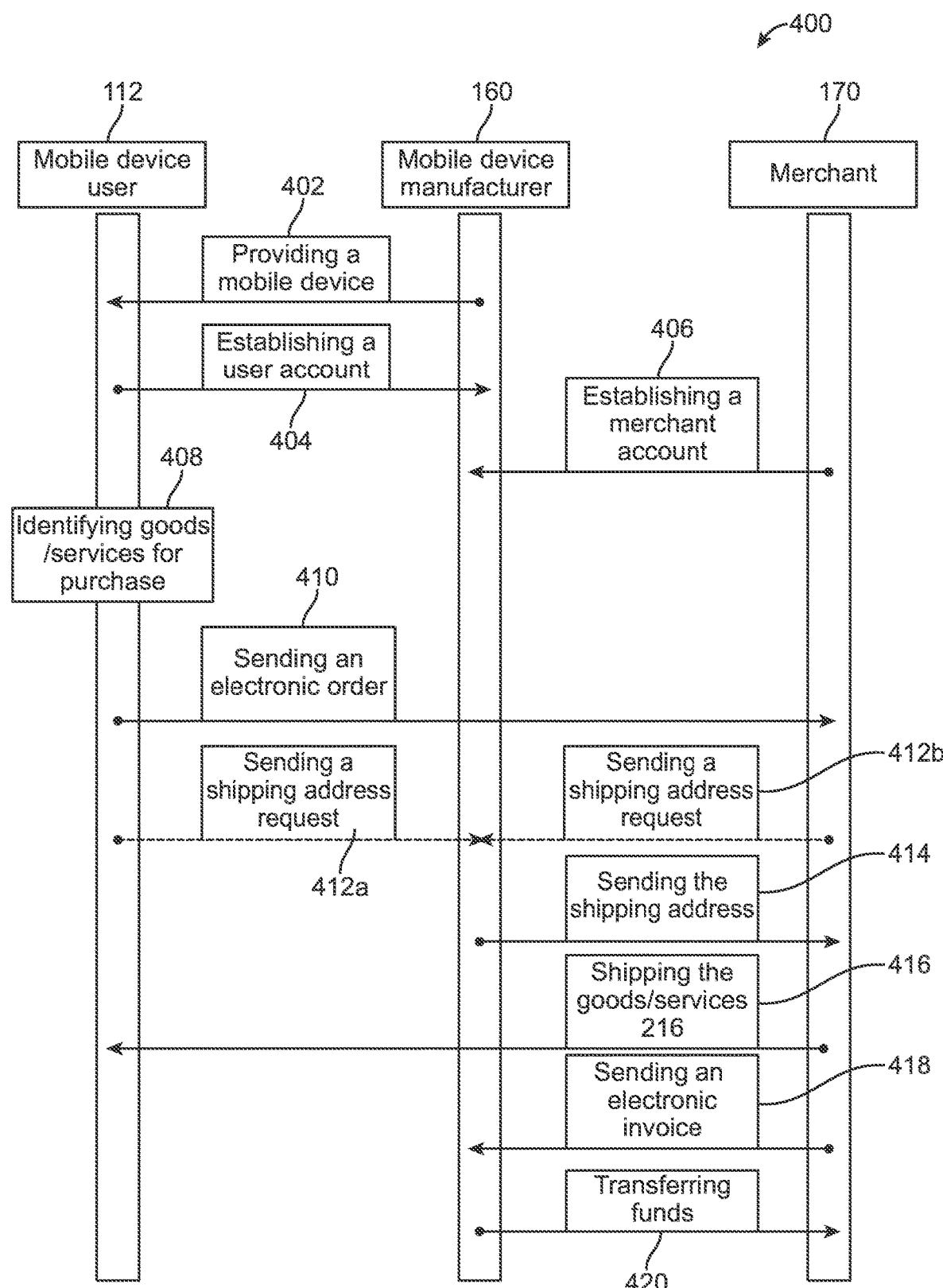
FIG. 4 is a block diagram of another embodiment of a mobile device payment method in accordance with the disclosure.

FIG. 4 is a block diagram of another embodiment of a mobile device payment method in accordance with the disclosure. In this embodiment, the method 400 provides for specifying a shipping address and shipping the goods/services. The method 400 can be performed on the mobile device payment system describe in association with FIG. 1 above.

Referring to FIG. 4, the method 400 for a mobile device user to purchase goods/services from a merchant with financing by a mobile device manufacturer can include: providing a mobile device 402 from the mobile device manufacturer to the mobile device user, the mobile device having a permanent identifier embedded in the mobile device; establishing a user account 404 for the mobile device user with the mobile device manufacturer, the user account associating the mobile device user with the permanent identifier and a shipping address; establishing a merchant account 406 for the merchant with the mobile device manufacturer; identifying on the mobile device goods/services for purchase 408 by the mobile device user; sending an electronic order 410 for the identified goods/services from the mobile device to the merchant, the electronic order including the permanent identifier and goods/services details for the identified goods/services, and no additional information about the mobile device user; sending a shipping address request 412 including the permanent identifier to the mobile device manufacturer; sending the shipping address 414 from the mobile device manufacturer to the merchant in response to the sending a shipping address request; shipping the goods/services 416 from the merchant to the mobile device user at the shipping address in response to the sending an electronic order; sending an electronic invoice 418 from the merchant to the mobile device manufacturer in response to the shipping the goods/services; and transferring funds 420 of the mobile device manufacturer to the merchant as an electronic merchant payment in response to the sending an electronic invoice. The permanent identifier is a unique identifier for the mobile device and the merchant identifier is a unique identifier for each merchant.

The providing a mobile device 402; establishing a user account 404; and establishing a merchant account 406 prepares the mobile device payment system for use by the mobile device user. The identifying on the mobile device goods/services for purchase 408 and sending an electronic order 410 allows the mobile device user to initiate purchase of particular goods/services. The sending a shipping address request 412; sending the shipping address 414; and shipping the goods/services 416 determines a shipping address for and ships the goods/services to the mobile device user. The sending an electronic invoice 418 and transferring funds 420 allows the mobile device manufacturer to pay the merchant for the particular goods/services.

The sending a shipping address request 412 can include various embodiments. In one embodiment, the sending a shipping address request 412 including the permanent identifier to the mobile device manufacturer can include sending the shipping address request including the permanent identifier from the merchant to the mobile device manufacturer 412b in response to the sending an electronic order. In one embodiment, the sending a shipping address request 412 including the permanent identifier to the mobile device manufacturer can include sending the electronic order including the permanent identifier from the mobile device to the mobile device manufacturer 412a.

Figure 5:
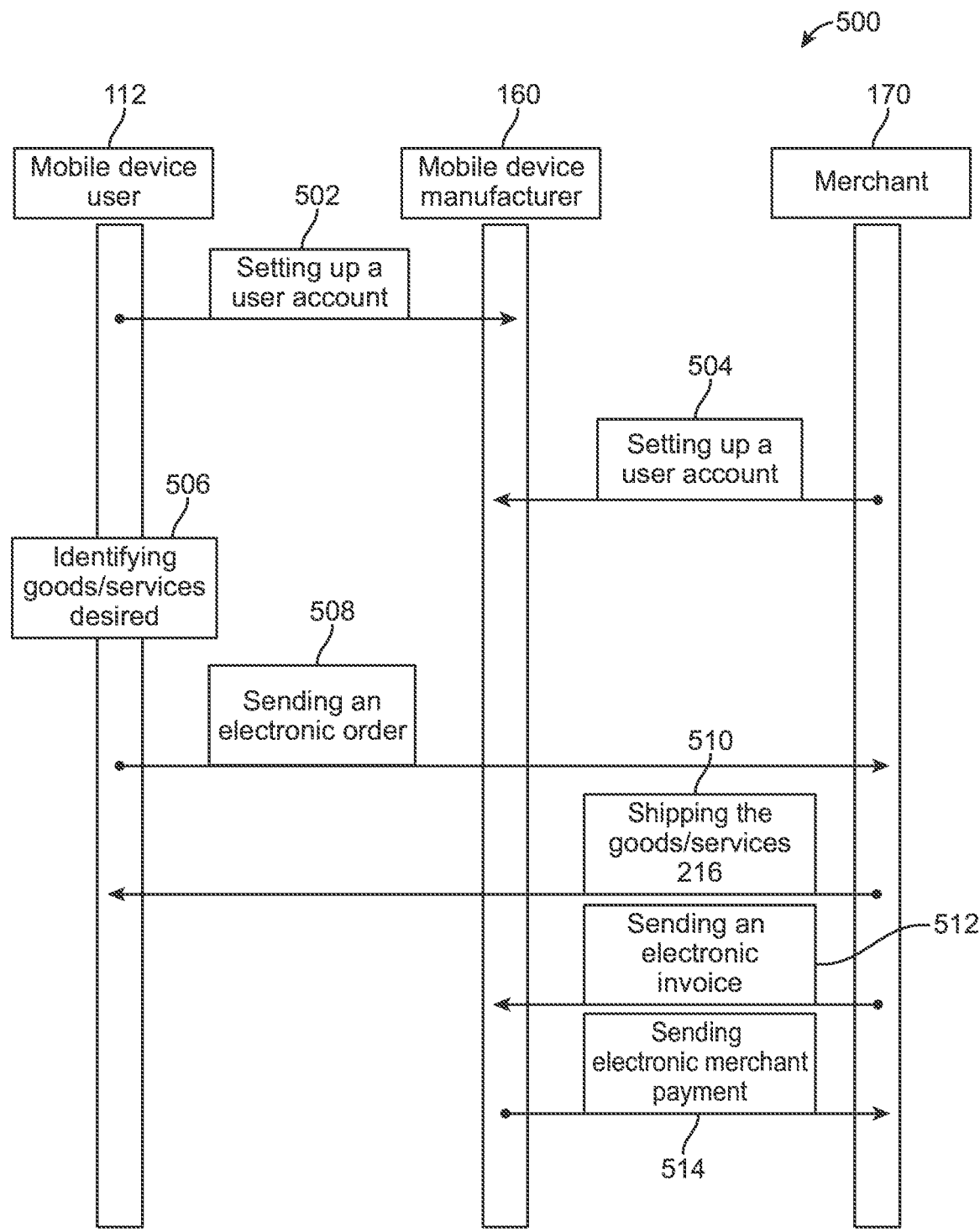
FIG. 5 is a block diagram of another embodiment of a mobile device payment method in accordance with the disclosure.

FIG. 5 is a block diagram of another embodiment of a mobile device payment method in accordance with the disclosure. In this embodiment, the method 500 provides for shipping the goods/services. The method 500 can be performed on the mobile device payment system describe in association with FIG. 1 above.

Referring to FIG. 5, the method 500 for a mobile device user to purchase goods/services from a merchant with financing by a mobile device manufacturer can include: setting up a user account for the mobile device user 502 with the mobile device manufacturer; setting up a user account for the merchant 504 with the mobile device manufacturer; identifying goods/services desired 506 by the mobile device user on a display of the mobile device; sending an electronic order 508 for the identified goods/services to the merchant from the display of the mobile device; shipping the goods/services 510 from the merchant to the mobile device user in response to the sending an electronic order; sending an electronic invoice 512 from the merchant to the mobile device manufacturer in response to the shipping the goods/services; and sending electronic merchant payment 514 from the mobile device manufacturer to the merchant in response to the sending an invoice. The mobile device can be a smart phone, a digital tablet, or the like. Exemplary mobile device manufacturers include Apple, Google, Microsoft, Samsung, Lenovo and the like.

The setting up a user account for the mobile device user 502 and setting up a user account for the merchant 504 prepares the mobile device payment system for use by the mobile device user. The identifying goods/services desired 506; sending an electronic order 508; and shipping the goods/services 510 allows the mobile device user to initiate purchase of and receive particular goods/services. The sending an electronic invoice 512 and sending electronic merchant payment 514 allows the mobile device manufacturer to pay the merchant for the particular goods/services.

The method 500 can also provide for payment of the mobile device manufacturer by the mobile device user. In one embodiment, the method 500 can further include sending an electronic bill from the mobile device manufacturer to the mobile device user; and sending user payment from the mobile device user to the mobile device manufacturer in response to the sending an electronic invoice. In another embodiment, the method 500 can further include setting up a revolving line of credit for the mobile device user with the mobile device manufacturer; sending an electronic bill from the mobile device manufacturer to the mobile device user; and periodically sending partial user payment from the mobile device user to the mobile device manufacturer in response to the sending an electronic bill.

The payment of the merchant for the particular goods/services can include various embodiments. The method 500 can also provide for problems with the user account of the mobile device user, e.g., when the mobile device user status is not acceptable due to credit problems, a lost mobile device which is reported stolen, or the like. In one embodiment, the method 500 can further include sending an electronic mobile device user identification request from the merchant to the mobile device manufacturer in response to the sending an electronic order 508; sending a mobile device user status from the mobile device manufacturer to the merchant in response to the sending an electronic mobile device user identification request; and the shipping the goods/services 510 can include canceling the shipping the goods/services when the mobile device user status is not acceptable. In another embodiment, the method 500 can further include sending an electronic mobile device user identification request from the merchant to the mobile device manufacturer in response to the sending an electronic order 508; sending a mobile device user status from the mobile device manufacturer to the merchant in response to the sending an electronic mobile device user identification request; and shutting down the mobile device when the mobile device user status is not acceptable.

In one embodiment, the sending of an electronic order 508 can include sending an electronic order for the identified goods/services to the merchant from the display of the mobile device by the mobile device user clicking on a single button on the display of the mobile device.

The initiation of the purchase of particular goods/services can include various embodiments. The method 500 can also include a mobile device user identifier linked to the particular mobile device and mobile device user. In one embodiment, the electronic order includes the mobile device user identifier, which can be constant for all electronic orders from the mobile device or can be a unique identifier generated by the mobile device for the particular electronic order. In another embodiment, the identifying goods/services desired 506 includes providing a mobile device user identifier to the merchant, such as providing the mobile device user identifier to the merchant when the link is established to the website of the merchant. In one example, the electronic order does not include the mobile device user identifier, which has already been provided when establishing the link from the mobile device to the merchant website.

The mobile device manufacturer is responsible for financing the goods/services transaction between the mobile device user and the merchant, so no credit card company is involved in the transaction. The method 500 can include the mobile device manufacturer being solely responsible for in-house bank functions for the user account. Exemplary in-house bank functions include transaction capture, transaction processing, bank conductivity, bank statement processing, reconciliation, bank statement distribution, and the like.

Figure 6:
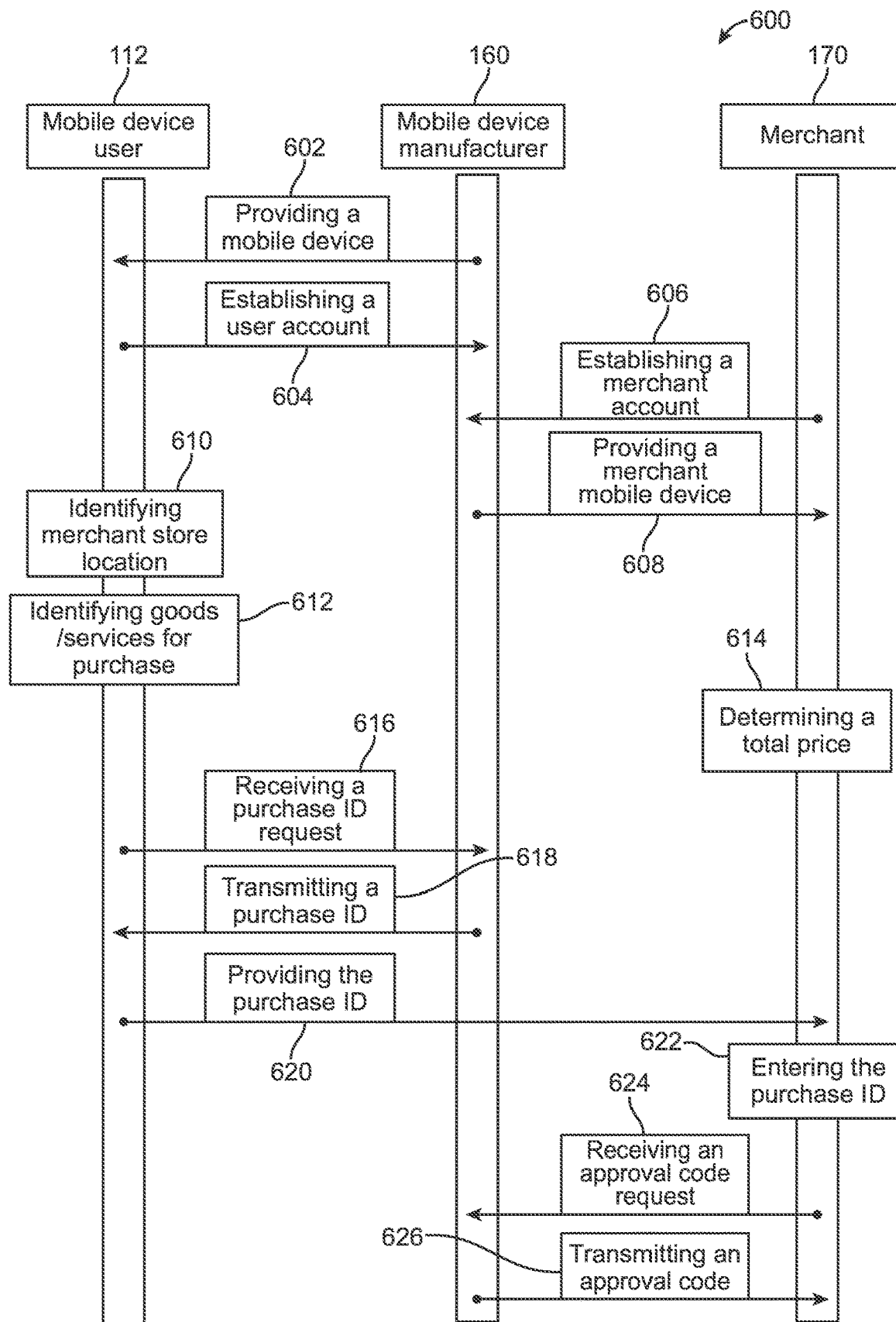
FIG. 6 is a block diagram of another embodiment of a mobile device payment method in accordance with the disclosure.

FIG. 6 is a block diagram of another embodiment of a mobile device payment method in accordance with the disclosure. In this embodiment, the method for a mobile device user to purchase goods/services from a merchant while in-store using their mobile device in the same way as a credit or debit card is typically used. The process can be executed as follows: (a) the merchant will register in advance for payment acceptance with the mobile device manufacturer, just as they would with a card provider, and receive their own merchant mobile device from the mobile device manufacturer, (b) when present in a store, after selecting products for purchase, the mobile device consumer user will identify the particular store manually or automatically, e.g., via GPS or other location service, when possible, (c) the merchant will use their existing point-of-sale equipment to record the sale, as usual, (d) the mobile device user will request a unique purchase ID from the manufacturer and provide it to the merchant, (e) the merchant will enter this purchase ID into their mobile device, (f) the mobile device manufacturer will respond to the merchant with an approval code, the same as the merchant would receive for a card purchase, thus completing the sale. The method 600 can be performed on the mobile device payment system describe in association with FIG. 1 above.

Referring to FIG. 6, the method 600 for a mobile device user to purchase goods/services from a merchant with financing by a mobile device manufacturer can include providing a mobile device 602 from the mobile device manufacturer to the mobile device user, the mobile device having a permanent identifier embedded in the mobile device; establishing a user account 604 for the mobile device user at the mobile device manufacturer, the user account associating the mobile device user with the permanent identifier; establishing a merchant account 606 for the merchant at the mobile device manufacturer, the merchant account including a merchant identifier for the merchant; and providing a merchant mobile device 608 from the mobile device manufacturer to the mobile device user, the mobile device having a merchant permanent identifier embedded in the merchant mobile device. As used herein, the merchant mobile device is defined as a smart phone, digital tablet, or any other portable wireless mobile device allowing the merchant 170 to communicate with the mobile device, the merchant server, and/or the mobile device manufacturer server. The permanent identifier, merchant identifier, and merchant permanent identifier are unique identifiers for the mobile device, merchant, and merchant mobile device, respectively.

The method 600 can continue with the mobile device user optionally identifying a merchant store location 610. In one embodiment, the mobile device identifies the merchant store location automatically using a GPS location device within the mobile device. In another embodiment, the mobile device user identifies the merchant store location by manually inputting the store name, address, zip code, or the like. In yet another embodiment, the identifying a merchant store location 610 is omitted from the method 600.

The method 600 can continue with identifying goods/services for purchase 612 and determining a total price 614 for the identified goods/services. In one embodiment, the identifying goods/services for purchase 612 includes the mobile device user selecting physical goods off the shelves at the merchant store location. In another embodiment, the identifying goods/services for purchase 612 includes the mobile device user selecting goods virtually on the mobile device. In one embodiment, the determining a total price 614 includes ringing up the identified goods/services at a cash register of the merchant.

The method 600 can continue with the mobile device manufacturer receiving a purchase ID request 616 from the mobile device user, the purchase ID request including the permanent identifier, and the mobile device manufacturer transmitting a purchase ID 618 to the mobile device user in response to the receiving a purchase ID request. In one embodiment, the purchase ID request optionally includes the merchant store location.

The method 600 can continue with the mobile device user providing the purchase ID 620 to the merchant and the merchant entering the purchase ID 622 in the merchant mobile device. The method 600 can conclude with the mobile device manufacturer receiving an approval code request 624 from the merchant, the approval code request including the purchase ID, and the mobile device manufacturer transmitting an approval code 626 to the merchant in response to the receiving an approval code request.

Those skilled in the art will appreciate that the elements of the methods described in association with FIGS. 2-6 can be stored as computer readable code on a non-transitory computer readable medium as desired for a particular application. The storage of computer readable code on a non-transitory computer readable medium for mobile device payment methods such as those discussed in association with FIGS. 2-6 can be illustrated by the storage of computer readable code on a non-transitory computer readable medium for the mobile device payment method as discussed in association with FIG. 2.

The storage of computer readable code of the elements of the method described in FIG. 2 can be illustrated as a non-transitory computer readable medium including computer readable code for a mobile device user to purchase goods/services from merchants with financing by a mobile device manufacturer providing a mobile device from the mobile device manufacturer to the mobile device user, the mobile device including a consumer account and a universal merchant account, the mobile device having a permanent identifier embedded in the mobile device, the medium comprising: computer readable code for establishing a user account for the mobile device user with the mobile device manufacturer, the user account associating the mobile device user with the permanent identifier; computer readable code for establishing merchant accounts for the merchants with the mobile device manufacturer, the merchant accounts including a merchant identifier and merchant credit deposit information for each of the merchants; computer readable code for transforming the merchant accounts into a universal merchant account data set; computer readable code for providing the universal merchant account data set to the mobile device user; computer readable code for storing the universal merchant account data set in the universal merchant account of the mobile device; computer readable code for requesting the mobile device manufacturer to load consumer credit into the consumer account by providing a credit amount and the permanent identifier to the mobile device manufacturer; computer readable code for loading the credit amount into the consumer account of the mobile device associated with the permanent identifier; computer readable code for identifying goods/services for purchase from a selected one of the merchants by the mobile device user on the mobile device; computer readable code for determining a total price for the identified goods/services and a merchant identifier associated with the selected merchant on the mobile device; computer readable code for receiving actuation of a purchase button on the mobile device; computer readable code for retrieving merchant bank deposit instructions for the associated merchant identifier from the universal vendor account in response to the actuation of the purchase button; computer readable code for retrieving purchase credit in an amount of the total price from the consumer account in response to the actuation of the purchase button; and computer readable code for routing the retrieved credit to the selected merchant in accordance with the retrieved merchant credit deposit instructions.

As defined herein, "non-transitory computer readable medium" comprises all computer readable medium, with the sole exception being a transitory, propagating signal. The non-transitory computer readable medium can include volatile and/or non-volatile memory. Volatile memory can include memory that depends upon power to store information, e.g., various types of dynamic random access memory (DRAM), and the like. Non-volatile memory can include memory that does not depend upon power to store information, e.g., solid state media such as flash memory, EEPROM, phase change random access memory (PCRAM), and the like. Other exemplary non-transitory computer readable medium include optical discs such as digital video discs (DVD), high definition digital versatile discs (HD DVD), compact discs (CD), and laser discs; magnetic media such as magnetic tapes, tape drives, floppy discs, and magnetic hard drives; solid state media such as flash memory, memory cards, solid-state drives, USB flash drives, random access memory (RAM), static random access memory (SRAM), dynamic random access memory (DRAM), magnetic random access memory (MRAM), phase change random access memory (PCRAM), read-only memory (ROM), programmable read-only memory (PROM), erasable programmable read-only memory (EPROM), electrically erasable programmable read-only memory (EEPROM); and other types of media from which a computer, a processor or other electronic device can read.

Those skilled in the art will further appreciate that the elements of the methods described in association with FIGS. 2-6 can be expressed as signals between components of the mobile device payment system when information is transferred between the components as desired for a particular application. The signals for mobile device payment methods such as those discussed in association with FIGS. 2-6 can be illustrated by signals for the mobile device payment method as discussed in association with FIG. 2.

The signals of the method described in FIG. 2 can be illustrated as a system for a mobile device user to purchase goods/services from merchants with financing by a mobile device manufacturer, the system comprising: a mobile device including a consumer account and a universal merchant account, the mobile device having a permanent identifier embedded in the mobile device; a mobile device manufacturer server operably connected to the mobile device and merchant servers; the merchant servers operably connected to the mobile device and the mobile device manufacturer server; wherein the mobile device is operable to send a user account request signal to the mobile device manufacturer server to establish a user account for the mobile device user with the mobile device manufacturer, the user account associating the mobile device user with the permanent identifier; wherein the merchant servers are operable to send merchant account request signals to the mobile device manufacturer server to establish merchant accounts for the merchants with the mobile device manufacturer, the merchant accounts including a merchant identifier and merchant credit deposit information for each of the merchants; wherein the mobile device manufacturer server is operable to transform the merchant accounts into a universal merchant account data set; wherein the mobile device manufacturer server is operable to send a data set signal to the mobile device to provide the universal merchant account data set to the mobile device user; wherein the mobile device is operable to store the universal merchant account data set in the universal merchant account of the mobile device; wherein the mobile device is operable to send a consumer credit request signal to the mobile device manufacturer server to request the mobile device manufacturer to load consumer credit into the consumer account by providing a credit amount and the permanent identifier to the mobile device manufacturer; wherein the merchant servers are operable to send credit amount signals to the mobile device to load the credit amount into the consumer account of the mobile device associated with the permanent identifier; wherein the mobile device is operable to identify goods/services for purchase from a selected one of the merchants by the mobile device user on the mobile device, determine a total price for the identified goods/services and a merchant identifier associated with the selected merchant on the mobile device, respond to actuating a purchase button on the mobile device, retrieve merchant bank deposit instructions for the associated merchant identifier from the universal vendor account in response to the actuating the purchase button, and retrieve purchase credit in an amount of the total price from the consumer account in response to the actuating the purchase button; and wherein the mobile device is operable to send a retrieved credit signal to the merchant servers to route the retrieved credit to the selected merchant in accordance with the retrieved merchant credit deposit instructions.

It is important to note that FIGS. 1-6 illustrate specific applications and embodiments of the disclosure, and are not intended to limit the scope of the present disclosure or claims to that which is presented therein. For example, other entities, such as a mobile device supplier, mobile device distributor, or the like, can take the place of the mobile device manufacturer. Upon reading the specification and reviewing the drawings hereof, it will become immediately obvious to those skilled in the art that myriad other embodiments of the invention are possible, and that such embodiments are contemplated and fall within the scope of the presently claimed invention. The elements of the methods described in association with the figures can be combined as desired for a particular application.

Figure 7:
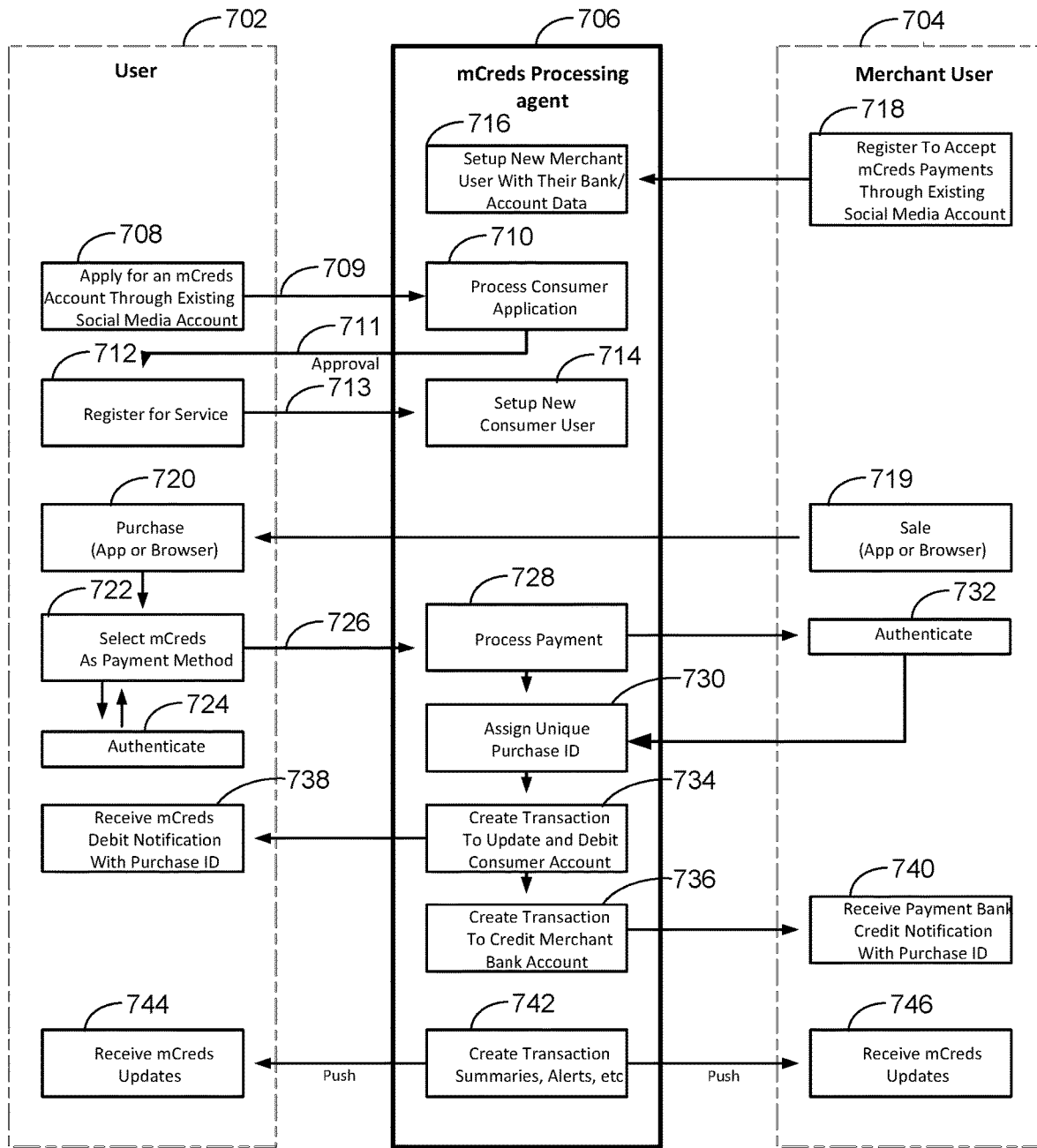
FIG. 7 is a block diagram of an alternative embodiment of a payment system in accordance with the disclosure.

An alternative embodiment for a payment system 700 in accordance with the disclosure is shown in FIG. 7. In the payment system 700, a transaction and payment for a purchase by a consumer 702 of a product or service from a merchant 704 is facilitated and transacted over an mCreds processing agent 706, which in the illustrated embodiment can be a social media platform such as Facebook or Linkedin, but in alternative embodiments can be any other entity or platform having numerous subscribers that access its servers on a regular basis. In general, the mCreds processing agent 706 can be any social media or other platform that operates computer servers onto which customers and merchants have created and maintain secure profiles.

In the embodiment shown in FIG. 7, and in no particular order, the customer or user 702 may first apply for an mCreds account through an existing or new account or profile with the mCreds processing agent at 708. For submitting the application via a secure Internet connection 709, the consumer may create or add information into a template that provides basic identity information about the consumer, and also other information such as shopping preferences, banking information, credit information, income information and the like. The processing agent 706 receives the application at 710 and may perform various verification actions, which are typical in the evaluation of whether to extend credit to a consumer in the industry and, upon approval at 711 of the application, ask the consumer to register for the service at 712. For registering for the service, the consumer may initiate a first stage of security for the newly established account. This security stage may require the consumer to download and install an authentication token application such as VIP Access by Symantec, which provides a live security code that is tied to a credential ID that is only known to the consumer and to the agent 706, acquire a hard token such as a near field communication (NFC) tag that is preloaded with a security certificate, and/or any combination of hard or soft tokens, including setting up the user's own password, security PIN, and the like. This and other security information may be provided back to the agent 706 at 713 for cataloging and saving into a profile that is created to set up a consumer user 714 with the agent 706.

In a similar fashion, the merchant 704 may create a merchant account at 716 with the agent using similar secure credentials such that the merchant is registered at 718 to accept mCreds payments through its existing or new account with the agent 706. It should be appreciated that the agent 706 may already have the ability to securely connect with the consumer 702 and also with the merchant 704, for example, by use of login and password information. Additional security using tokens is optional and may be used to authenticate each user and also each user's computer or smart phone or tablet used to access the mCreds service. For example, a user may be authenticated by having the user log into the agent's service via the Internet. When an mCreds transaction based on the user's profile at 714, the device the user employs to log into the agent's platform may also be authenticated by a one-way or two-way authentication. One exemplary configuration of a two-way authentication, i.e., authentication of the user to the agent and merchant and also authentication of the agent and merchant to the user, is shown in the schematic shown in FIG. 8 for a mobile phone application.

Figure 8:
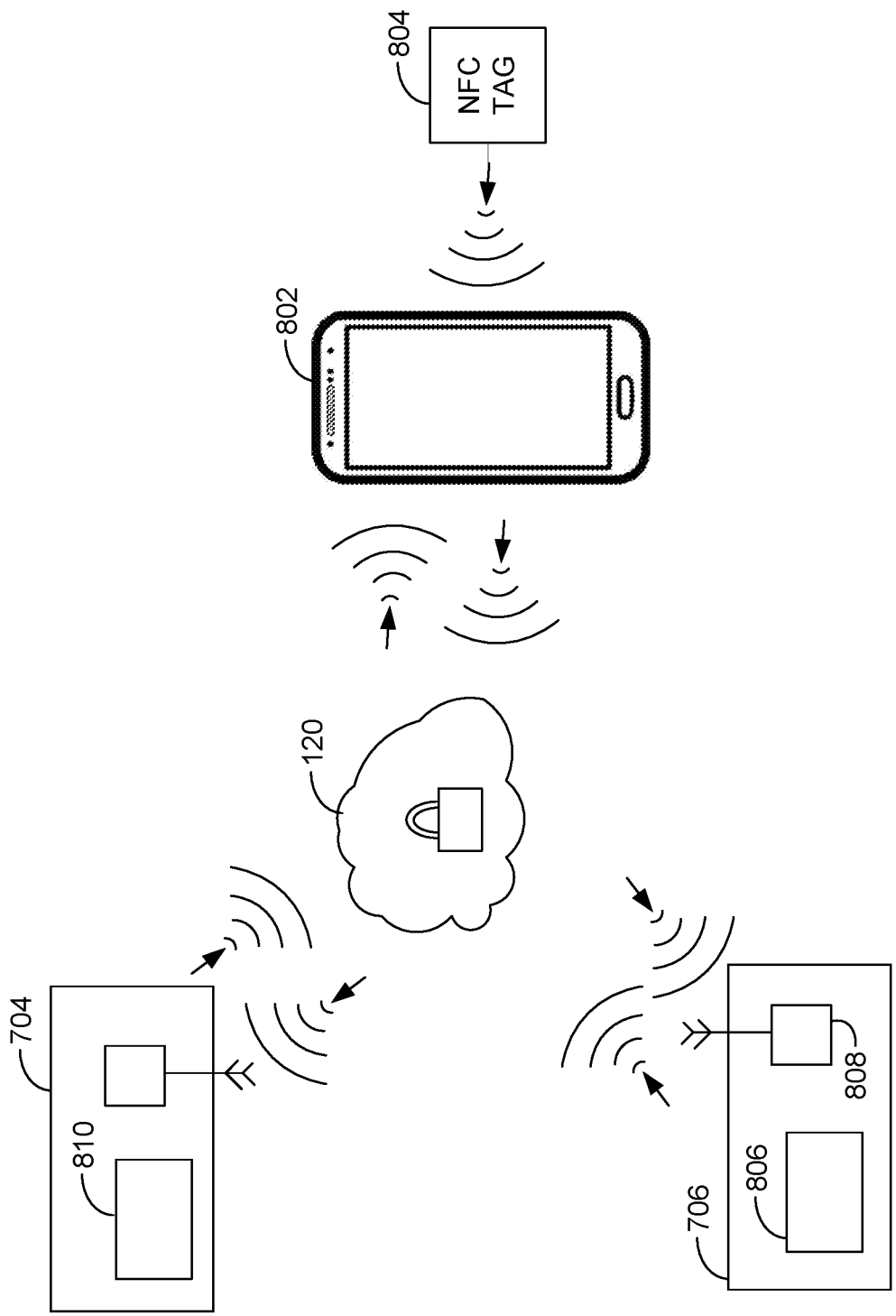
FIG. 8 is a schematic diagram of payment authentication in accordance with the disclosure.

In reference to FIG. 8, an authentication system 800 for use when paying using the mCreds system is shown. The authentication system 800 includes a mobile phone 802 having appropriate software and hardware installed to communicate with NFC devices. The phone 802 may be selectively activated to retrieve a unique identifier code from a unique NFC tag 804. The NFC tag 804 can be supplied by the agent 706 and include a pre-defined identifier code, which can be used as an authentication credential and which is tied or associated with the particular user 702 in a database 806 under that user's profile at the servers 808 of the agent 706. In another embodiment, the phone 802 may have an authentication string predefined therein, for example, by the device manufacturer or service provider, which is provided to the server for authentication of the phone. The authentication string is a unique string of characters that identifies the phone. Examples of existing information that can be used as an authentication string can include the phone or SIM card information of the phone such as the phone or SIM card serial number, the phone IMEI number and the like. In the case when the phone is a personal computer, similar information strings that are unique to each computer can be used to authenticate the particular computer. When a transaction is initiated by the user, the user may retrieve its unique identifier from the NFC tag 804 or otherwise retrieve the predefined authentication string. In the embodiment when an NFC tag is used, the tag can be a standalone tag or may be removably or permanently integrated or associated with the user's mobile phone 802, for example, placed internally to the phone by a phone manufacturer, added with an adhesive onto a case of the phone, and the like. The unique identifier, which identifies the user's device, may be encrypted and sent to the agent and/or the merchant for authentication, which includes un-encrypting and looking for a match with the same credential as it resides in the agent or merchant's database 810. In this way, a one way authentication can be accomplished whereby the user's device is authenticated with the agent. The user is also authenticated separately from the user's device, for example, when logging in or providing other information to access the agent's platform. In a similar fashion, a second-way authentication of the agent's servers may be carried out by the user's mobile phone 802, to avoid the opportunity of fraud, whereby a unique agent identifier number for that user's account is retrieved from the Internet 120 and compared for a match with a unique agent code that is preloaded onto the NFC tag 804.

Returning now to FIG. 7, the user 702 may browse the agent's site until a particular product or service that is available for sale by the merchant at 719 is identified for purchase by the user at 720. The user may then select a desired payment method, which in this case involves payment using the mCreds system at 722. An optional authentication of the user, and the user's device, is carried out at 724. As previously described, the authentication of the user may include requesting a password, personal identification number (PIN), or other information from the user so that the user can be authenticated or re-authenticated with the agent's 706 servers. Authentication or re-authentication of the user's device, e.g., mobile phone, computer, and the like, may involve entry of a credential, communication with an NFC tag to acquire a credential, and the like. The user and device credentials can then be sent to the agent's 706 server in an encrypted message 726 so that the user and the user's device can be validated before payment is processed at 728.

When payment is processed, a unique purchase ID is assigned at 730 for the particular user, user's device, and purchase transaction between the user and the particular merchant. Assignment of the purchase ID at 730 may further include an optional authentication 732 with the merchant, which may ensure that the product (or service) being purchased is available for sale, that the merchant is current in its registration with the agent 706 to accept mCreds payments, and the like. Upon successful authentication of the merchant at 732, the transaction is created that operates to debit the user's mCreds account at 734, and credit the merchant's account at 736. Notifications that reflect the successful creation of the transaction are generated to inform the user that its account has been debited at 738 and the merchant's account has been credited at 740. It should be appreciated that the actual transfer of mCreds may occur upon creation of the transaction, but is preferably effected when shipment of a product from the merchant has been made.

Apart from these and other operations that the agent may undertake, the agent may periodically create summaries and provide account statements at 742 such that the user can receive account updates at 744 and the merchant can also receive updates at 746.

Figure 9:
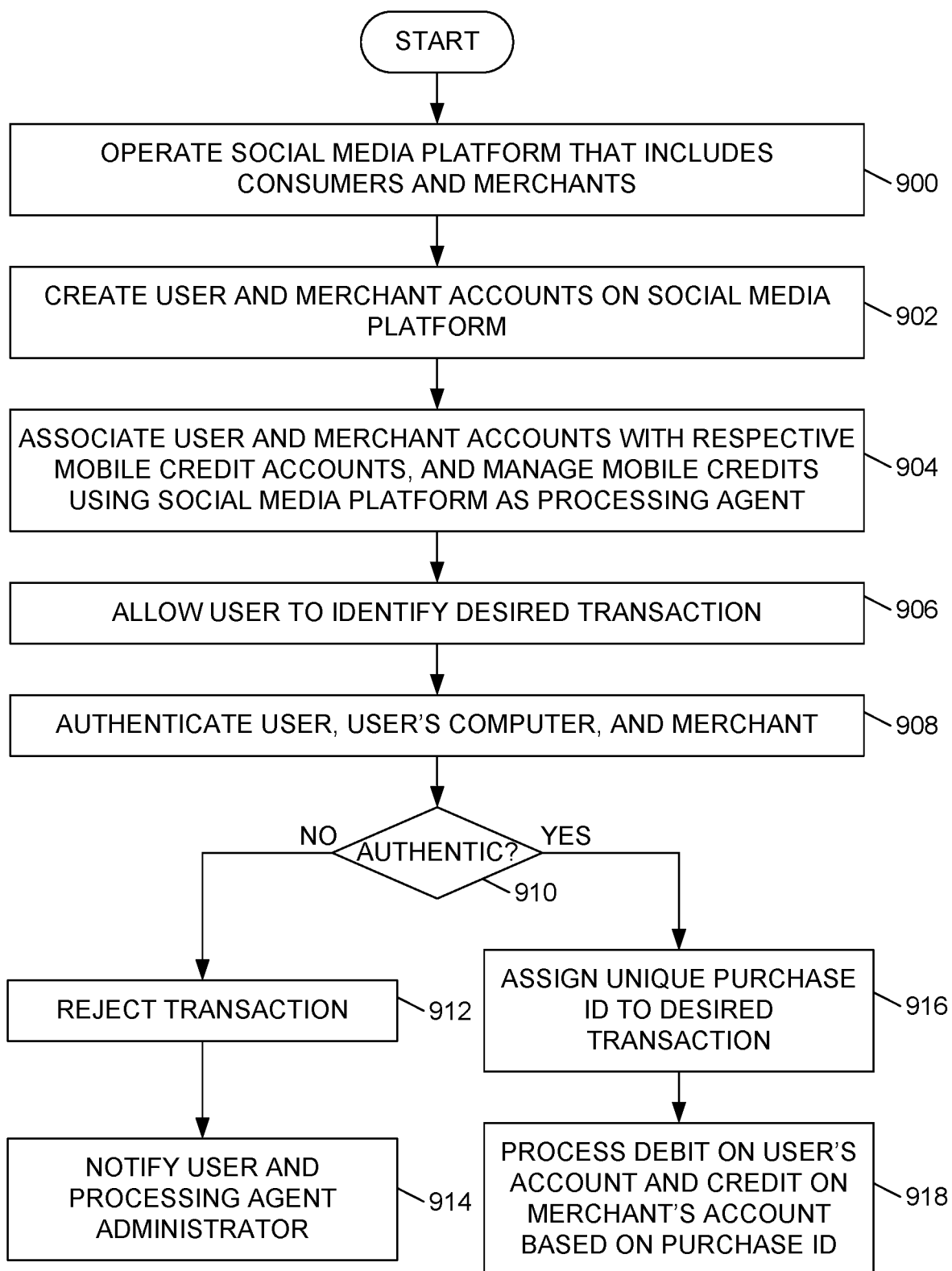
FIG. 9 is a flowchart for a method in accordance with the disclosure.

A flowchart for a method of operating a payment system over a social media or other public platform having a broad subscriber base is shown in FIG. 9. The method includes operating a social media platform that includes a broad base of members, including possible consumers and merchants at 900. Members of the platform can apply and, upon approval, have user and merchant accounts created on the social media platform at 902 for transacting business within the social media platform, which facilitates business transactions between a user and a merchant by providing a transfer of value or currency between a user and a merchant. The application and approval process may include, but is not limited to, an identification or creation of a credit line for each user, and also an identification of banking information for the merchant such that a payment from the user to the merchant, which is facilitated within the social media platform, is possible. In this respect, the social media platform, acting as a processing agent for payments and other transactions, associates user and merchant accounts with respective mobile credit (mCreds) accounts at 904.

In the normal course, the social media platform will operate as normal by providing information about products from various merchants in informational streams that are made available to the entire subscriber base of the social media platform including registered users. A user can thus view and, at certain times, select a particular product for purchase from a particular merchant on the social media platform. In this way, a user may identify a desired transaction at 906. Upon identification of a desired transaction, each of the user and the user's media for accessing the social media platform such as a computer, tablet or mobile phone and the like is separately authenticated to discourage fraud at 908. At the same time, the merchant may also be authenticated. The authentication of the user may be carried out by requesting unique credentials from the user. The user's device may be authenticated using a token that was provided to the user at registration of the user's account with the processing agent.

Upon authentication the user, the user's device and, optionally, the merchant, at 910, a unique purchase identification strung is assigned to the desired transaction at 916 and the processing agent processes a debit to the user and a credit to the merchant for the purchase price at 918. In the event an authorization fails at 910, the transaction is rejected at 912 and a notification is generated to notify the user and an administrator of the processing agent of a possible fraud.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

The invention claimed is:

1. A payment method for facilitating a transaction between a user and a merchant with financing by a user computing device manufacturer over a social media platform for a desired transaction of goods or services, comprising:

providing a user computing device, the user computing device including a consumer account and a universal merchant account, the user computing device having a permanent user device identifier embedded in the user computing device while being configured to be operated by the user and having embedded therein a permanent user device identifier;

establishing user account and merchant accounts with a social media platform including a database associated with a computer server, the computer server being in communication with the user computing device for exchange of information pertaining to authentication of the user based on user credentials and authentication of the user computing device based on the permanent user device identifier;

transforming the merchant accounts into universal merchant data sets for the user computing device embedded with the permanent user device identifier;

providing the universal merchant account data set to the user computing device user;

storing the universal merchant account data set in the universal merchant account of the user computing device;

requesting the user computing device manufacturer to load consumer credit into the consumer account by providing a credit amount and the permanent identifier to the user computing device manufacturer;

loading the credit amount into the consumer account of the user computing device associated with the permanent identifier; and providing a merchant computing device, the merchant computing device being operated by the merchant and being in communication with the computer server of the social media platform, the merchant computing device having embedded therein a permanent merchant device identifier;

identifying a desired transaction by the user on the computer server;

accessing a user account in the database, the user account including the user credential, the permanent user device identifier, and a user mobile credit account;

accessing the merchant account in the database, the merchant account including at least a merchant mobile credit account and the permanent merchant identifier;

authenticating the user, by comparing a provided user credential provided by the user with the user credential present in the database;

authenticating the user computing device by comparing a provided user device identifier with the permanent user device identifier present in the database; and processing a debit to the user mobile credit account and a credit to the merchant mobile credit account.

2. The payment method of claim 1, wherein authenticating the user includes receiving a provided user credential from the user into the computer server, using the computer server to retrieve the user credential from the database, and comparing with the computer server the provided user credential with the user credential from the database to authenticate the user when the provided user credential exactly matches the user credential from the database.

3. The payment method of claim 1, wherein the user computing device is configured to provide an authentication string.

4. The payment method of claim 3, wherein authenticating the user computing device includes receiving the authentication string from the user computing device, retrieving the user computing device credential from the database, and comparing the authentication string with the user computing device credential to authenticate the user computing device when the provided authentication string exactly matches the user computing device credential from the database.

5. The payment method of claim 4, wherein the authentication string is predefined in the user authentication device.

6. The payment method of claim 5, and wherein the authentication string is a predefined string of characters provided to the social media platform and maintained in the user account.

7. The payment method of claim 1, wherein the computer server is further configured to assign a unique transaction identifier to the desired transaction after the user and the user computing device have been authenticated.

8. The payment method of claim 1, wherein mobile credits are at least one of any type of legal currency, bitcoins, cryptocurrency, digital assets and merchant credit.

9. The payment method of claim 1, wherein the computer server communicates with the user computing device over a secure internet connection, and messages relating to the user and the user computing device authentications are transmitted in an encrypted format.

10. The payment method of claim 1, wherein the user computing device is a mobile phone.

11. A method for facilitating a transaction between a user and a merchant with financing by a user computing device manufacturer over a social media platform for a desired transaction of goods or services, comprising:

providing a user computing device configured to be operated by the user and having embedded therein a permanent user device identifier;

operating a social media platform including a database associated with a computer server, the computer server being in communication with the user computing device for exchange of information pertaining to authentication of the user based on user credentials and authentication of the user computing device based on the permanent user device identifier;

transforming the merchant accounts into universal merchant data sets for the user computing device embedded with the permanent user device identifier;

providing the universal merchant account data set to the user computing device user, storing the universal merchant account data set in the universal merchant account of the user computing device;

requesting the user computing device manufacturer to load consumer credit into the consumer account by providing a credit amount and the permanent identifier to the user computing device manufacturer;

loading the credit amount into the consumer account of the user computing device associated with the permanent identifier;

providing a merchant computing device in communication with the computer server of the social media platform, the merchant computing device having embedded therein a permanent merchant device identifier;

identifying a desired transaction by the user on the computer server;

using the computer server to maintain a user account in the database, the user account including at least a user credential, a user computing device credential, and a user mobile credit account;

using the computer server to maintain a merchant account in the database, the merchant account including at least a merchant mobile credit account;

authenticating the user, by comparing a provided user credential provided by the user with the user credential present in the database;

authenticating the user computing device by comparing a provided user device identifier with the permanent user device identifier present in the database; and facilitating the desired transaction by processing a debit to the user mobile credit account and a credit to the merchant mobile credit account.

12. The method of claim 11, wherein authenticating the user includes receiving a provided user credential from the user into the computer server, using the computer server to retrieve the user credential from the database, and comparing with the computer server the provided user credential with the user credential from the database to authenticate the user when the provided user credential exactly matches the user credential from the database.

13. The method of claim 11, further comprising configuring the user computing device to provide an authentication string.

14. The method of claim 13, wherein authenticating the user computing device includes receiving the authentication string from the user computing device, retrieving the user computing device credential from the database, and comparing the authentication string with the user computing device credential to authenticate the user computing device when the provided authentication string exactly matches the user computing device credential from the database.

15. The method of claim 14, wherein the authentication string is predefined in the user computing device.

16. The method of claim 15, wherein the authentication string is a predefined string of characters provided to the social media platform and maintained in the user account.

17. The method of claim 11, further comprising configuring the computer server to assign a unique transaction identifier to the desired transaction after the user and the user computing device have been authenticated.

18. The method of claim 11, wherein mobile credits are at least one of any type of legal currency, bitcoins, cryptocurrency, digital assets and merchant credit.

19. The method of claim 11, wherein the computer server communicates with the user computing device over a secure internet connection, and messages relating to the user and the user computing device authentications are transmitted in an encrypted format.

20. The method of claim 11, wherein the user computing device is a mobile phone.

* * * * *